United States Patent [19]

Skwirut et al.

[11] 4,393,330
[45] Jul. 12, 1983

[54] METHOD FOR EFFECTIVELY CONTACTING MANGANESE-ACTIVATED ZINC SILICATE PHOSPHOR WITH ANTIMONY OXIDE DURING PHOSPHOR COATING, AND RESULTING LAMP

[75] Inventors: Henry Skwirut, Verona; Robert G. Young, Nutley, both of N.J.

[73] Assignee: North American Philips Electric Corp., New York, N.Y.

[21] Appl. No.: 198,494

[22] Filed: Oct. 20, 1980

[51] Int. Cl.³ .................. H01J 61/48; B05D 1/38; B05D 7/22
[52] U.S. Cl. .................................. 313/487; 427/67
[58] Field of Search .......................... 427/67; 313/487

[56] References Cited

U.S. PATENT DOCUMENTS 2,607,014  8/1952  Roy et al. ........................... 313/486
3,348,961  10/1967  Ropp et al. ......................... 427/67
4,088,923  5/1978  Manders .............................. 313/487
4,305,019  12/1981  Graff et al. ......................... 313/487

Primary Examiner—James R. Hoffman

[57] ABSTRACT

For fluorescent lamps which use a double layer of phosphor with manganese-activated zinc silicate phosphor in the overlying layer, a small predetermined amount of finely-divided antimony oxide is added to the first phosphor layer coating paint which, after application, is lehred at a temperature which is sufficient to volatilize the organic binder but which is insufficient to volatilize more than a minor proportion of the antimony oxide. Thereafter, the second phosphor layer coating paint which includes the zinc silicate is applied over the first-applied layer and the applied second layer coating paint is then lehred at a temperature which is sufficient to volatilize an appreciable portion of the residual antimony oxide in the first-applied layer to cause the volatilized antimony oxide to contact the zinc silicate.

25 Claims, 2 Drawing Figures

METHOD FOR EFFECTIVELY CONTACTING MANGANESE-ACTIVATED ZINC SILICATE PHOSPHOR WITH ANTIMONY OXIDE DURING PHOSPHOR COATING, AND RESULTING LAMP

CROSS-REFERENCE TO RELATED APPLICATIONS

In copending application Ser. No. 058,574, filed July 17, 1979 by J. Van Broekhoven and R. Corth, and owned by the present assignee (now U.S. Pat. No. 4,263,530), is disclosed a fluorescent lamp which incorporates a phosphor blend of warm-white color which comprises a mixture of calcium fluoroapatite activated by antimony and manganese and yttrium oxide activated by trivalent europium. The resulting lamp has both improved output and color rendering index as well as improved color preference index as compared to a standard fluorescent lamp which incorporates a halophosphate phosphor of the same color temperature.

In copending application Ser. No. 108,269, filed Dec. 31, 1979 by Henry Skwirut and Robert G. Young, the present applicants, and owned by the present assignee, now U.S. Pat. No. 4,315,192, is disclosed an improved fluorescent lamp which utilizes a three-component high-performance phosphor blend coated as a layer next to the envelope with a very thin layer of protective phosphor coating thereover so that it faces the discharge.

In copending application Ser. No. 109,008, filed Dec. 31, 1979 by Eugene A. Graff and Jacob Van Broekhoven, and owned by the present assignee (now U.S. Pat. No. 4,305,019), is disclosed an improved fluorescent lamp which utilizes a three-component high-performance phosphor blend which is subject to color shifts. To provide the dual function of decreasing the amount of the expensive high-performance blend and also to screen against possible color shifts which might occur in this blend, without appreciably affecting overall lamp performance, there is provided a phosphor undercoat next to the envelope which not only is less expensive, but which in itself has both good color rendering properties and efficacy.

BACKGROUND OF THE INVENTION

This invention generally relates to fluorescent lamps and, more particularly, to a method for effectively contacting manganese-activated zinc silicate phosphor with antimony oxide during the deposition of multiple phosphor layers, and the resulting lamp.

Fluorescent lamps are fabricated to provide various color temperatures of emission which generally correspond to the color temperature of a complete or full radiator maintained at the specified temperature. A warm-white correlated color temperature is specified as being about 3000° K. and a cool-white color temperature is specified as being about 4100° K. For illumination in the home, the public normally seems to prefer the warmer color, possibly due to long-time familiarity with the incandescent lamp which has a warm color.

U.S. Pat. No. 3,858,082, dated Dec. 3, 1974 to Thornton discloses various three-component phosphor blends which can be used in fluorescent lamps in order to provide both good color rendition of illuminated objects and a high light output. One embodiment of the phosphor blend which is disclosed in this patent uses apatite-structured strontium chlorophosphate activated by divalent europium as a blue-emitting phosphor component, manganese-activated zinc silicate phosphor as a green-emitting phosphor component and yttrium oxide activated by trivalent europium as a red-orange emitting phosphor component. The relative proportions of these components can be varied to provide the lamp with the predetermined correlated color temperature which can vary over a wide range, although the most popular color temperature for these lamps is about 3000° K. The overall performance of such lamps is excellent, but on occasion the green-emitting phosphor component displays a relatively rapid depreciation of light output, particularly in the vicinity of the electrode, which causes a color shift to occur. Although this normally does not affect the overall performance of the lamp, it can be considered objectionable from an asthetic standpoint.

U.S. Pat. No. 3,937,998, dated Feb. 10, 1976 to Verstegen et al. discloses a three-component phosphor blend for use in fluorescent lamps, in order to provide both good color rendition of illuminated objects and a high light output. The components comprising this phosphor blend are quite expensive and to decrease the amount of these expensive components needed, there is disclosed in U.S. Pat. No. 4,088,923, dated May 9, 1978 to Manders an underlayer of relatively inexpensive halophosphate phosphor of the same emission color, so that the expensive phosphor blend components are "worked harder" and less material is required. A two-layer phosphor coating is also disclosed in U.S. Pat. No. 3,602,758 dated Aug. 31, 1971 to Thornton et al.

It is well known to add a small amount of antimony oxide to a silicate-type phosphor, in order to improve the performance thereof as disclosed in U.S. Pat. No. 2,607,014, dated Aug. 12, 1952 to Roy et al. In U.S. Pat. No. 3,348,961 dated Oct. 24, 1967 to Ropp et al. is disclosed adding a small predetermined amount of finely-divided antimony oxide to the paint used for coating manganese-activated zinc silicate, in order to improve the performance of the fluorescent lamp which incorporates the zinc silicate phosphor.

The internationally accepted procedure for standardizing and measuring the color rendering properties of light sources is set forth in the publication of The International Commission on Illumination, identified as Publication CIE No. 13(E-1.3.2) 1965. More recently, a color-preference index has been proposed for rating the performance of light sources in accordance with what the normal observer considers to be the preferred coloration for familiar objects. This color preference index (CPI) is summarized in the Journal of the Illuminating Engineering Society, pages 48–52 (October 1974) article entitled "A Validation of the Color-Preference Index" by W. A. Thornton.

SUMMARY OF THE INVENTION

There is provided a fluorescent lamp having a predetermined correlated color temperature and combined high efficiency and good color rendition. The lamp comprises the usual sealed, elongated, light-transmitting envelope having electrodes operatively positioned therein proximate the ends thereof and enclosing a dischage-sustaining filling comprising mercury and a small charge of inert, ionizable starting gas which when energized generates a discharge comprising ultraviolet radiations and a limited proportion of visible radiations. A phosphor means comprising a predetermined amount of a first phosphor layer is carried on the inner surface of the envelope and a predetermined amount of a second phosphor layer is coated on and carried on the first phosphor layer so that the second layer is positioned nearer to the discharge.

In accordance with the present invention, the first phosphor layer principally comprises finely-divided apatite-structured calcium halophosphate activated by predetermined proportions of antimony and manganese and when the first phosphor layer is excited by the discharge, it emits visible radiations of a color which approximates the predetermined correlated color temperature of the lamp. The first phosphor layer is applied to the envelope by flowing over the envelope interior surface a phosphor coating paint comprising a liquid vehicle and organic binder having the first phosphor suspended therein as a slurry. The coating paint also includes a small predetermined amount of finely-divided antimony oxide, and after application, the applied coating paint is lehred at a temperature sufficient to volatilize the organic binder, but insufficient to volatilize more than a minor proportion of the antimony oxide.

The second phosphor layer substantially comprises a mixture of predetermined amounts and relative proportions of finely-divided narrow-band blue-emitting phosphor activated by divalent europium having an emission substantially confined to the wavelength range of from 430 nm to 485 nm, finely-divided green-emitting manganese-activated zinc silicate, and finely-divided red-orange-emitting trivalent-europium-activated yttrium oxide. The predetermined amounts and relative proportions of the mixed phosphors comprising the second layer when excited by the discharge emit visible radiations of a color which approximates the predetermined correlated color temperature of the lamp. The second phosphor layer is applied in predetermined amount by flowing over the lehred first phosphor layer, a second phosphor layer coating paint comprising a liquid vehicle and organic binder having the phosphors of the second layer mixed and suspended therein as a slurry. After application, the second layer applied coating paint is lehred at a temperature sufficient to drive organic binder therefrom and also sufficient to volatilize an appreciable portion of the residual antimony oxide in the first phosphor layer to cause the volatilized antimony oxide to contact the manganese activated zinc silicate in the second layer. The predetermined amount of antimony oxide which is added to the first phosphor means coating paint is conveniently based on the total weight of phosphor which is to be included in the first and second layers. The lehring temperature of the first applied phosphor means coating paint is less than 600° C. so that a major proportion of the antimony oxide remains therein. The lehring temperature of the second applied coating paint is greater than 600° C. so that an appreciable portion of the residual antimony oxide in the first layer is volatilized in order to cause it to contact the manganese-activated zinc silicate. For some applications, it is also advantageous to provide a very thin coating of protective phosphor over the second-applied phosphor layer, in order to provide a three-layer lamp. This third layer is so compounded as to have an emission color which approximates the predetermined correlated color temperature desired for the lamp.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENTS

Figure 1:
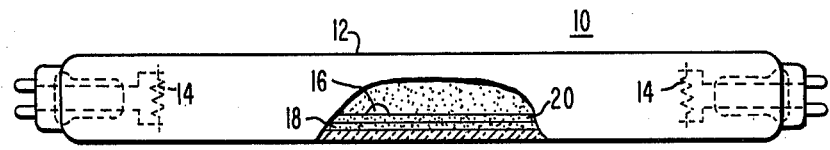
FIG. 1 is an elevational view, partly broken away, of a fluorescent lamp which incorporates a double layer of specific phosphor which has been coated in accordance with the present invention.

With specific reference to the form of the invention illustrated in the drawings, the lamp 10 as shown in FIG. 1 is generally conventional and comprises a sealed, elongated, light-transmitting envelope 12 having electrodes 14 operatively positioned therein proximate the ends thereof and enclosing a discharge-sustaining filling comprising mercury 16 and a small charge of inert ionizable starting gas, such as a few torrs of argon or mixed argon and neon, for example. When the lamp is energized, the resulting low-pressure mercury discharge generates ultraviolet radiations and a limited proportion of visible radiations, with the latter constituting a strong mercury line at 436 nm, a relatively strong green line at 546 nm, and a relatively weak line at 578 nm, with the composite mercury emission appearing blue to the eye.

Coated on the inner surface of the envelope 12 is a phosphor means comprising a predetermined amount of a first phosphor layer 18 carried on the inner surface of the envelope and a predetermined amount of a second phosphor layer 20 coated on and carried on the first phosphor layer 18 so that the second phosphor layer is positioned nearest to the discharge of the operating lamp. The first phosphor layer 18 principally comprises finely-divided apatite-structured calcium halophosphate activated by predetermined proportions of antimony and manganese. As a specific example, the first phosphor layer 18 is a selected mixture of calcium fluoroapatite and europium-activated yttrium oxide as described in heretofore referenced copending application Ser. No. 058,574, now U.S. Pat. No. 4,263,530. In its preferred form, this first phosphor layer 18 comprises a mixture of predetermined amounts and relative proportions of apatite structured calcium fluorophosphate activated by antimony and manganese and yttrium oxide activated by trivalent europium. The antimony activator constitutes from 0.4 to 1% by weight and the manganese activator constitutes from 1 to 1.5% by weight of the calcium fluorophosphate phosphor. The europium activator constitutes from 2 to 13% by weight of the yttrium oxide phosphor. The apatite-structured calcium fluorophosphate phosphor exhibits a broadband emission of visible radiations and the yttrium oxide phosphor exhibits a narrow emission in the red-orange region of the visible spectrum. The predetermined amounts and relative proportions of the apatite-structured fluorophosphate and the yttrium oxide phosphor are selected to provide the phosphor blend with a predetermined correlated color temperature of emission which approximates that desired for the lamp.

The second phosphor layer 20 principally comprises a mixture of predetermined amounts and relative proportions of finely-divided narrow-band blue-emitting phosphor activated by divalent europium having an emission substantially confined to the wavelength range of from 430 nm to 485 nm, finely-divided green-emitting manganese-activated zinc silicate, and finely-divided red-orange-emitting trivalent-europium-activated yttrium oxide. The predetermined amounts and relative proportions of the mixed phosphors comprising the second phosphor layer 20, when excited by the discharge, emit visible radiations of a color which approximates the predetermined correlated color temperature desired for the lamp.

In order to provide the lamp with a correlated color temperature of approximately 3000° K., the relative weight proportions of the apatite-structured calcium fluorophosphate phosphor and the yttrium oxide in the first layer 18 are about 79:21. The relative weight proportions of the blue-emitting to green-emitting to red-orange-emitting phosphors comprising the second layer are approximately 4:24:72. As a specific example, the first phosphor layer 18 has a coating weight of from about 1 mg/cm$^2$ to about 3.5 mg/cm$^2$, and the second phosphor layer 20 has a coating weight of from about 1 mg/cm$^2$ to about 3 mg/cm$^2$, with the combined coating weights of the first phosphor layer 18 and the second phosphor layer 20 falling within the range of from about 3.1 mg/cm$^2$ to about 5.5 mg/cm$^2$. As a specific example, each of the layers 18 and 20 are coated to a weight of 2.3 mg/cm$^2$. In the case of a 40WT12 fluorescent lamp bulb, this specific coating weight will provide a total phosphor coating weight of approximately 3 grams for each of the layers 18 and 20. Since the zinc silicate component of the second phosphor layer constitutes 24% by weight of this blend, for this specific example, the zinc silicate is present in amount of approximately 0.72 gram.

In accordance with the present invention, for preparing a lamp having a correlated color temperature of approximately 3000° K., for coating onto the envelope 12 as shown in FIG. 1, the phosphors comprising the layer 18 are mixed in the weight ratio of about 79% calcium fluoroapatite and about 21% yttrium oxide. The coating technique is conventional wherein the phosphors are suspended as a slurry in a vehicle such as water, with the small amount of organic binder material, with added components such as wetting and deflocculating agents which forms the so-called coating paint. The paint is modified, however, by adding to the paint a small, predetermined amount of finely-divided antimony oxide which is calculated to be present in accordance with the total weight of phosphor which is to be included in the first layer 18 and the second layer 20. As a specific example, the antimony oxide is incorporated into the first phosphor coating paint is very finely-divided form so that the antimony oxide (Sb$_2$O$_3$) has an average particle size of approximately 1.2 microns. Preferably, it is deposited in amount of about one-quarter percent by weight of the total weight of phosphor which is to be included in the first phosphor layer 18 and the second phosphor layer 20. For a warm-white color lamp, the antimony oxide is incorporated in the first phosphor coating paint in amount of approximately 15 mg. The coating paint is then flowed over the inner surface of the envelope using techniques such as described in U.S. Pat. Nos. 3,832,199, dated Aug. 24, 1974 and 3,833,392, dated Sept. 3, 1974. The preferred organic binder material is polyethylene oxide which can be readily volatilized by lehring at relatively low temperatures. Such a binder is well known as described in Canadian Pat. No. 1,045,908 dated Jan. 9, 1979. Other known organic binders can be substituted therefor. In accordance with the present invention, the first-applied coating paint is then lehred at a temperature which is sufficient to volatilize the organic binder therefrom but insufficient to volatilize more than a minor proportion of the antimony oxide which has been added to the coating paint. As a specific example, when using the polyethylene oxide organic binder, the first-applied coating paint is lehred at a temperature less than 600° C. for a sufficient time to volatilize this organic binder but insufficient to volatilize more than a minor amount of the antimony oxide. As a specific example, a lehring temperature of 550° C. for a period of one minute will accomplish this end.

The second phosphor layer 20 is then applied by flowing the second layer coating paint over the lehred first phosphor layer. The second phosphor layer coating paint is compounded similarly to the first layer coating paint with the preferred binder being polyethylene oxide. After application, the applied second layer coating paint is lehred at a temperature sufficient to drive the organic binder therefrom and also sufficient to volatilize an appreciable portion of residual antimony oxide in the lehred first phosphor layer 18 to cause the volatilize antimony oxide to contact the manganese-activated zinc silicate in the applied second layer. As a specific example, a lehring temperature greater than 600° C., such as 650° C. for one minute is sufficient to volatilize an appreciable portion of residual antimony oxide in the first layer. This has been found to be very effective for treating the zinc silicate phosphor since the volatilized antimony oxide must traverse the entire second layer 20 and substantially all surface portions of the zinc silicate phosphor are contacted. The performance of these two-layer 3000° K. lamps is summarized hereinafter in Table I, see lamp designated (2).

Preferably, the antimony oxide is in the form of antimony trioxide although other oxides of antimony can be substituted therefor. The antimony trioxide of course is added to the first coating paint in amount sufficient to deposit with the first layer phosphor an amount of antimony trioxide which is equal to a small predetermined percent of the weight of total phosphor which is to be included in the first and second phosphor layers. Preferably, this amount of antimony trioxide which is added is about 0.25 wt.% of the total phosphor. Preferably, the amount of added antimony trioxide falls within the range of from about 0.1% by weight to about 0.5% by weight of the predetermined amount of the total phosphor to be included in the first and second phosphor layers.

Other correlated color temperatures can readily be provided for the finished lamp by adjusting the phosphors which form the first and second layers. As an example, the lamp can be provided with a correlated color temperature of about 4100° K. by forming the first phosphor layer 18 from a mixture of finely-divided bluish-white apatite-structured calcium fluorochlorophosphate activated by antimony and manganese, apatite-structured calcium fluorophosphate activated by antimony and manganese, and yttrium oxide activated by from 2 to 13 wt.% trivalent europium, with the weight ratios of the fluorochlorophosphate to calcium fluorophosphate to yttrium oxide phosphor in the first layer being about 56:40:4. The weight ratio of the red-orange-emitting phosphor to the green-emitting phosphor to the blue-emitting phosphor in the second layer is about 57:29:14 to provide this correlated color temperature.

A lamp having a correlated color temperature of about 5000° K. can be fabricated by forming the first layer of a mixture of finely-divided bluish-white apatite structured calcium fluorochlorophosphate activated by antimony and manganese and apatite-structured calcium fluorophosphate activated by antimony and manganese, with the weight ratio of calcium fluorochlorophosphate to calcium fluorophosphate in the first layer 18 being about 77:23. The relative weight ratio of the red-orange-emitting phosphor to the green-emitting phosphor to the blue-emitting phosphor in the second layer is about 50:35:15 to provide such a correlated color temperature.

The foregoing lamp embodiments can be modified by replacing a part of the green-emitting zinc silicate phosphor of the layer 20 with an equal weight of green-emitting cerium- and terbium-activated magnesium aluminate, as described in U.S. Pat. No. 3,937,998. The use of this latter phosphor will cause the composite lamp to have a somewhat lower color preference index (CPI), but the aluminate phosphor is very stable. As an example, for any of the lamp embodiments as described hereinbefore, e.g., the 3000° K., 4100° K. and 5000° K. lamps, one quarter of the zinc silicate can be replaced by an equal weight of the foregoing green-emitting aluminate phosphor.

In all cases in accordance with the present invention, the antimony oxide in finely-divided form is deposited with the first phosphor layer coating paint which is then lehred at a relatively low temperature which is sufficient to drive off the organic binder but which is insufficient to volatilize more than a minor proportion of the antimony oxide. Thereafter, when the second-applied phosphor coating paint is lehred at a temperature sufficient to volatilize the antimony oxide, this volatilized material traverses the entire thickness of the second applied layer and in doing so effectively contacts the zinc silicate phosphor.

The mechanism by which the antimony oxide improves the zinc silicate in its performance is not clearly understood, but the effect of the improved performance has been known for many years. In accordance with the present method, a substantial improvement in the color stability of the lamps is achieved as compared to prior art lamps wherein the antimony oxide is added directly to the coating paint which contains the zinc silicate phosphor.

Figure 2:
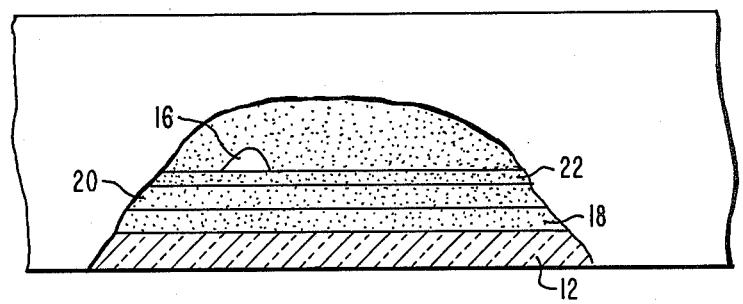
FIG. 2 is an enlarged fragmentary showing of a fluorescent lamp, partly broken away, generally similar to FIG. 1 but incorporating a triple layer of phosphor which has been coated in accordance with the present invention.

In FIG. 2 is shown an enlarged view of an alternative embodiment wherein the first phosphor layer 18 is applied to the inner surface of the envelope 12 in the manner as described in the previous embodiment. The second phosphor layer 20 comprises the three component blend as previously described. Over the second-applied phosphor layer 20 is applied a third phosphor layer 22 which substantially comprises a mixture of predetermined amounts and relative proportions of finely-divided narrow-band blue-emitting phosphor activated by divalent europium and having an emission substantially confined to the wavelength range of from 430 nm to 485 nm, finely-divided green-emitting magnesium aluminate activated by cerium and terbium, and finely-divided red-orange-emitting trivalent-europium-activated yttrium oxide. The predetermined amounts and relative proportions of these mixed phosphors comprising the third layer when excited by the discharge emit visible radiations of a color which approximates the predetermined correlated color temperature desired for the lamp. In such an embodiment, the first two layers can be identical with those as described for the embodiment shown in FIG. 1. The third layer 22 can incorporate the strontium chlorapatite phosphor as the blue-emitting material and to provide a correlated color temperature of 3000° K., the red-emitting, green-emitting and blue-emitting phosphors are mixed in the relative weight proportions of about 71:27:2. Other color temperatures can readily be provided by modifying these respective ratios.

The green-emitting cerium- and terbium-activated magnesium aluminate phosphor is described in the aforementioned U.S. Pat. No. 3,937,998. The blue emission in the third layer 22 can be supplied by divalent-europium-activated barium magnesium aluminate such as described in this indicated Verstegen patent. While the use of the terbium-activated phosphor in forming the very thin overlayer 22 decreases the color preference index of the composite lamp, this reduction in performance is minimal because of the small amount of this phosphor, and the thin overlay of phosphor 22 serves to provide added protection for the primary light-emitting layer 20. The first layer 18 should have a coating weight of from about 1 mg/cm$^2$ to about 3.5 mg/cm$^2$ with the second phosphor layer having a coating weight of from about 1 mg/cm$^2$ to about 3 mg/cm$^2$. The third phosphor layer 22 should have a coating weight of from about 0.15 mg/cm$^2$ to about 0.7 mg/cm$^2$ and the combined coating weights of the first and second and third phosphor layers should fall within the range of from about 3.1 mg/cm$^2$ to about 6.2 mg/cm$^2$. In applying the third phosphor layer 22, the application techniques are those which were used in applying the first phosphor layer 18 and the second phosphor layer 20, with the preferred binder material being polyethylene oxide. After the phosphor layers are applied as described, the lamps are completely fabricated in accordance with conventional techniques. The performance of these three-layer 3000° K. lamps is summarized hereinafter in Table I, see lamps designated (3).

To prepare a three-layer lamp having a correlated color temperature of about 4100° K., the first phosphor layer 18 and second phosphor layer 20 are applied as previously described for such a lamp. For the third phosphor layer 22, the weight ratio or the red-orange-emitting to green-emitting to blue-emitting components is about 57:33:10. To prepare a lamp utilizing three layers of phosphor with a correlated color temperature of about 5000° K., the first phosphor layer 18 and the second phosphor layer are as previously described for such a lamp. For the third phosphor layer 22, the weight ratio of the red-orange-emitting to green-emitting to blue-emitting components is about 50:39:11.

In the following Table I are given performance data for the 3000° K. two-layer and three-layer lamps as described hereinbefore. The 3000° K. control lamps to which performance is compared utilized a single layer, three-component phosphor blend of divalent-europium-activated strontium chloroapatite, zinc silicate, and trivalent-europium-activated yttrium oxide, optimized for best performance.

TABLE I

| Lamp Design | 100-Hour Output (Relative Brightness) | CPI | Relative Phosphor Cost | Remarks |
|---|---|---|---|---|
| 3-Component Blend-Single Layer | 100 units | 115 | 100 units | Some tendency for color shifts |
| 2-Layer Lamps Designated (2) | 104 units | 109 | 58 units | Stable Performance |
| 3-Layer Lamps Designated (3) | 106 units | 104 | 58 units | Stable Performance |

We claim:

1. A fluorescent lamp having a predetermined correlated color temperature and combined high efficacy and good color rendition, said lamp comprising a sealed elongated light-transmitting envelope having electrodes operatively positioned therein proximate the ends thereof and enclosing a discharge-sustaining filling comprising mercury and a small charge of inert ionizable starting gas which when energized generates a discharge comprising ultraviolet radiations and a limited proportion of visible radiations, phosphor means comprising a predetermined amount of a first phosphor layer carried on the inner surface of said envelope and a predetermined amount of a second phosphor layer coated on and carried on said first phosphor layer so that said second phosphor layer is positioned nearer to said discharge than said first phosphor layer;

said first phosphor layer principally comprising finely divided apatite-structured calcium halophosphate activated by predetermined proportions of antimony and manganese, said first phosphor layer when excited by said discharge, emitting visible radiations of a color which approximates said predetermined correlated color temperature of said lamp, said first phosphor layer having been applied in predetermined amount by flowing over the envelope interior surface a phosphor coating paint comprising a liquid vehicle and organic binder having said first phosphor suspended therein as a slurry, said coating paint also including a small predetermined amount of finely divided antimony oxide, and said applied coating paint having been lehred at a temperature sufficient to volatilize the organic binder therefrom but insufficient to volatilize more than a minor proportion of said antimony oxide; and said second phosphor layer substantially comprising a mixture of predetermined amounts and relative proportions of finely divided narrow-band blue-emitting phosphor activated by divalent europium having an emission substantially confined to the wavelength range of from 430 nm to 485 nm, finely divided green-emitting phosphor comprising manganese-activated zinc silicate, and finely divided red-orange-emitting trivalent-europium-activated yttrium oxide, the predetermined amounts and relative proportions of said mixed phosphors comprising said second phosphor layer when excited by said discharge emitting visible radiations of a color which approximates said predetermined correlated color temperature of said lamp, said second phosphor layer having been applied in predetermined amount by flowing over said lehred first phosphor layer a second phosphor coating paint comprising a liquid vehicle and organic binder having said phosphors of said second layer mixed and suspended therein as a slurry, and said second layer applied coating paint having been lehred at a temperature sufficient to drive organic binder therefrom and also sufficient to volatilize an appreciable portion of residual antimony oxide in said first phosphor layer to cause said volatilized antimony oxide to contact said manganese-activated zinc silicate.

2. The lamp as specified in claim 1, wherein said antimony oxide is in the form of antimony trioxide, and said antimony trioxide is added to said first coating paint in amount sufficient to deposit with said first layer phosphor an amount of antimony trioxide which is equal to about 0.1% to about 0.5% by weight of the predetermined amount of the total phosphor which is to be included in said first and second phosphor layers.

3. The lamp as specified in claim 2, wherein said antimony trioxide is added to said first layer coating paint in predetermined amount sufficient to deposit with said first phosphor layer an amount of antimony trioxide which is equal to about one-quarter percent by weight of the total phosphor which is to be included in said first and second phosphor layers.

4. The lamp as specified in claim 2, wherein said first phosphor layer has a coating weight of from about 1 mg/cm$^2$ to about 3.5 mg/cm$^2$, said second phosphor layer has a coating weight of from about 1 mg/cm$^2$ to about 3 mg/cm$^2$, and the combined coating weights of said first phosphor layer and said second phosphor layer fall within the range of from about 3.1 mg/cm$^2$ to about 5.5 mg/cm$^2$.

5. The lamp as specified in claim 2, wherein said lamp has a correlated color temperature of about 3000° K., said first phosphor layer principally comprises a mixture of predetermined amounts and relative proportions of apatite-structured calcium fluorophosphate activated by antimony and manganese and yttrium oxide activated by trivalent europium, said antimony activator constituting from 0.4 to 1 weight percent and said manganese activator constituting from 1 to 1.5 weight percent of said apatite-structured calcium fluorophosphate phosphor, said europium activator constituting from 2 to 13 weight percent of said yttrium oxide first layer phosphor, said apatite-structured calcium fluorophosphate phosphor having a broad band emission of visible radiations, said yttrium oxide first layer phosphor having a narrow emission in the red-orange region of the visible spectrum, and the predetermined amounts and relative proportions of said apatite-structured calcium fluorophosphate phosphor and said yttrium oxide first layer phosphor being such that the composite emission of said first phosphor layer has a correlated color temperature of approximately 3000° K.

6. The lamp as specified in claim 5, wherein said apatite-structured calcium fluorophosphate phosphor and said yttrium oxide first layer phosphor are uniformly mixed as said first phosphor layer, with the relative weight proportions of said apatite-structured calcium fluorophosphate phosphor and said yttrium oxide first layer phosphor being about 79:21, and said second phosphor layer utilizes strontium chlorophosphate activated by divalent europium as the narrow-band blue-emitting phosphor and the weight ratio of red-orange to green to blue-emitting phosphors of said second phosphor layer respectively is about 72:24:4.

7. The fluorescent lamp as specified in claim 2, wherein said lamp has a correlated color temperature of about 4100° K., said first phosphor layer is a mixture of finely divided bluish-white apatite-structured calcium fluorochlorophosphate activated by antimony and manganese, apatite-structured calcium fluorophosphate activated by antimony and manganese, and yttrium oxide activated by from 2 to 13 wt.% trivalent europium, with the weight ratio of said calcium fluorochlorophosphate to said calcium fluorophosphate to said yttrium oxide phosphor in said first phosphor layer being about 56:40:4, and the relative weight ratio of said red-orange-emitting phosphor to said green-emitting phosphor to said blue-emitting phosphor in said second phosphor layer is about 57:29:14.

8. The fluorescent lamp as specified in claim 2, wherein said lamp has a correlated color temperature of about 5000° K., said first phosphor layer is a mixture of finely divided bluish-white apatite-structured calcium fluorochlorophosphate activated by antimony and manganese and apatite-structured calcium fluorophosphate activated by antimony and manganese, the weight ratio of said calcium fluorochlorophosphate to said calcium fluorophosphate phosphor in said first phosphor layer is about 77:23, and the relative weight ratio of said red-orange-emitting phosphor to said green-emitting phosphor to said blue-emitting phosphor in said second phosphor layer is about 50:35:15.

9. The lamp as specified in claim 2, wherein said first applied phosphor coating paint is lehred at a temperature of less than 600° C., and said second applied phosphor coating paint is lehred at a temperature greater than 600° C.

10. The lamp as specified in claim 9, wherein said first applied phosphor coating paint is lehred at a temperature of about 550° C., and said second applied phosphor coating paint is lehred at a temperature of about 650° C.

11. A fluorescent lamp having a predetermined correlated color temperature and combined high efficacy and good color rendition, said lamp comprising a sealed elongated light-transmitting envelope having electrodes operatively positioned therein proximate the ends thereof and enclosing a discharge-sustaining filling comprising mercury and a small charge of inert ionizable starting gas which when energized generates a discharge comprising ultraviolet radiations and a limited proportion of visible radiations, phosphor means comprising a predetermined amount of a first phosphor layer carried on the inner surface of said envelope, a predetermined amount of a second phosphor layer coated on and carried on said first phosphor layer, and a predetermined amount of a third phosphor layer coated on and carried on said second phosphor layer so that said third phosphor layer is positioned nearest to said discharge;

said first phosphor layer principally comprising finely divided apatite-structured calcium halophosphate activated by predetermined proportions of antimony and manganese, said first phosphor layer when excited by said discharge emitting visible radiations of a color which approximates said predetermined correlated color temperature of said lamp, said first phosphor layer having been applied in predetermined amount by flowing over the envelope interior surface a phosphor coating paint comprising a liquid vehicle and organic binder having said first phosphor suspended therein as a slurry, said coating paint also including a small predetermined amount of finely divided antimony oxide, and said applied coating paint having been lehred at a temperature sufficient to volatilize the organic binder therefrom but insufficient to volatilize more than a minor proportion of said antimony oxide; and said second phosphor layer substantially comprising a mixture of predetermined amounts and relative proportions of finely divided narrow-band blue-emitting phosphor activated by divalent europium and having an emission substantially confined to the wavelength range of from 430 nm to 485 nm, finely divided green-emitting manganese-activated zinc silicate, and finely divided red-orange-emitting trivalent-europium-activated yttrium oxide, the predetermined amounts and relative proportions of said mixed phosphors comprising said second phosphor layer when excited by said discharge emitting visible radiations of a color which approximates said predetermined correlated color temperature of said lamp, said second phosphor layer having been applied in predetermined amount by flowing over said lehred first phosphor layer a second phosphor coating paint comprising a liquid vehicle and organic binder having said phosphors of said second layer mixed and suspended therein as a slurry, and said second layer applied coating paint having been lehred at a temperature sufficient to drive organic binder therefrom and also sufficient to volatilize an appreciable portion of residual antimony oxide in said first phosphor layer to cause said volatilized antimony oxide to contact said manganese-activated zinc silicate; and said third phosphor layer substantially comprising a mixture of predetermined amounts and relative proportions of finely divided narrow-band blue-emitting phosphor activated by divalent europium and having an emission substantially confined to the wavelength range of from 430 nm to 485 nm, finely divided green-emitting magnesium aluminate activated by cerium and terbium, and finely divided red-orange-emitting trivalent-europium-activated yttrium oxide, and the predetermined amounts and relative proportions of said mixed phosphors comprising said third layer when excited by said discharge emitting visible radiations of a color which approximates said predetermined correlated color temperature of said lamp.

12. The lamp as specified in claim 11, wherein said antimony oxide is in the form of antimony trioxide, and said antimony trioxide is added to said first coating layer in amount sufficient to deposit with said first layer phosphor an amount of antimony trioxide which is equal to about 0.1% to about 0.5% by weight of the predetermined amount of the total phosphor which is to be included in said first and second phosphor layers.

13. The lamp as specified in claim 12, wherein said antimony trioxide is added to said first layer coating paint in predetermined amount sufficient to deposit with said first phosphor layer an amount of antimony trioxide which is equal to about one-quarter percent by weight of the predetermined amount of the total phosphor which is to be included in said first and second phosphor layers.

14. The lamp as specified in claim 12, wherein said first phosphor layer has a coating weight of from about 1 mg/cm$^2$ to about 3.5 mg/cm$^2$, said second phosphor layer has a coating weight of from about 1 mg/cm$^2$ to about 3 mg/cm$^2$, said third phosphor layer has a coating weight of from about 0.15 mg/cm$^2$ to about 0.7 mg/cm², and the combined coating weights of said first and second and third phosphor layers fall within the range of from about 3.1 mg/cm² to about 6.2 mg/cm².

15. The lamp as specified in claim 12, wherein said lamp has a correlated color temperature of about 3000° K., said first phosphor layer principally comprises a mixture of predetermined amounts and relative proportions of apatite-structured calcium fluorophosphate activated by antimony and manganese and yttrium oxide activated by trivalent europium, said antimony activator constituting from 0.4 to 1 weight percent and said manganese activator constituting from 1 to 1.5 weight percent of said apatite-structured calcium fluorophosphate phosphor, said europium activator constituting from 2 to 13 weight percent of said yttrium oxide first layer phosphor, said apatite-structured calcium fluorophosphate phosphor having a broad band emission of visible radiations, said yttrium oxide first layer phosphor having a narrow emission in the red-orange region of the visible spectrum, and the predetermined amounts and relative proportions of said apatite-structured calcium fluorophosphate phosphor and said yttrium oxide first layer phosphor being such that the composite emission of said first phosphor layer has a correlated color temperature of approximately 3000° K.

16. The lamp as specified in claim 15, wherein said apatite-structured calcium fluorophosphate phosphor and said yttrium oxide first layer phosphor are uniformly mixed as said first phosphor layer, with the relative weight proportions of said apatite-structured calcium fluorophosphate phosphor and said yttrium oxide first layer phosphor being about 79:21, said second phosphor layer utilizes strontium chlorophosphate activated by divalent europium as the narrow-band blue-emitting phosphor and the weight ratio of red-orange to green to blue-emitting phosphors of said second phosphor layer respectively is about 72:24:4, and said third phosphor layer utilizes strontium chlorophosphate activated by divalent europium as the narrow-band blue-emitting phosphor and the weight ratio of red-orange to green to blue-emitting phosphors of said third phosphor layer respectively is about 71:27:2.

17. The fluorescent lamp as specified in claim 12, wherein said lamp has a correlated color temperature of about 4100° K., said first phosphor layer is a mixture of finely divided bluish-white apatite-structured calcium fluorochlorophosphate activated by antimony and manganese, apatite-structured calcium fluorophosphate activated by antimony and manganese, and yttrium oxide activated by from 2 to 13 wt.% trivalent europium, with the weight ratio of said calcium fluorochlorophosphate to said calcium fluorophosphate to said yttrium oxide phosphor in said first phosphor layer being about 56:40:4, the relative weight ratio of said red-orange-emitting phosphor to said green-emitting phosphor to said blue-emitting phosphor in said second phosphor layer is about 57:29:14, and the relative weight ratio of said red-orange-emitting phosphor to said green-emitting phosphor to said blue-emitting phosphor in said third phosphor layer is about 57:33:10.

18. The fluorescent lamp as specified in claim 12, wherein said lamp has a correlated color temperature of about 5000° K, said first phosphor layer is a mixture of finely divided bluish-white apatite-structured calcium fluorochlorophosphate activated by antimony and manganese and apatite-structured calcium fluorophosphate activated by antimony and manganese, the weight ratio of said calcium fluorochlorophosphate to said calcium fluorophosphate phosphor in said first phosphor layer is about 77:23, the relative weight ratio of said red-orange-emitting phosphor to said green-emitting phosphor to said blue-emitting phosphor in said second phosphor layer is about 50:35:15, and the relative weight ratio of said red-orange-emitting phosphor to said green-emitting phosphor to said blue-emitting phosphor in said third phosphor layer is about 50:39:11.

19. The lamp as specified in claim 11, wherein said first applied phosphor coating paint is lehred at a temperature of less than 600° C., and said second applied phosphor coating paint is lehred at a temperature greater than 600° C.

20. The lamp as specified in claim 19, wherein said first applied phosphor coating paint is lehred at a temperature of about 550° C., and said second applied phosphor coating paint is lehred at a temperature of about 650° C.

21. The method of effectively exposing manganese-activated zinc silicate phosphor to antimony oxide in order to improve the performance of said zinc silicate phosphor when it is included as a part of a multiple layer phosphor coating on the interior surface of an elongated envelope for a fluorescent lamp, which method comprises:
   in the lamp manufacturing process, flowing over the envelope interior surface a first phosphor means coating paint comprising a liquid vehicle and organic binder having a first phosphor means suspended therein as a slurry, and said coating paint also including a small predetermined amount of finely divided antimony oxide, and lehring said envelope and applied coating paint at a temperature sufficient to volatilize the organic binder therefrom but insufficient to volatilize more than a minor proportion of said antimony oxide;
   flowing over said lehred first phosphor means layer a second phosphor means coating paint comprising a liquid vehicle and organic binder having a second phosphor means which includes said manganese-activated zinc silicate suspended therein as a slurry, and lehring said envelope and applied second coating paint at a temperature sufficient to volatilize the organic binder therefrom and also sufficient to volatilize and appreciable portion of residual antimony oxide in said first-applied phosphor means layer to cause said volatilized antimony oxide to contact said manganese-activated zinc silicate.

22. The method as specified in claim 21, wherein said first phosphor means coating paint is lehred at a temperature less than 600° C., and said second phosphor means coating paint is lehred at a temperature greater than 600° C.

23. The method as specified in claim 22, wherein said first phosphor means coating paint is lehred at a temperature of about 550° C., and said second phosphor means coating paint is lehred at a temperature of about 650° C.

24. The method as specified in claim 21, wherein said antimony oxide is in the form of antimony trioxide, said antimony trioxide content in said first phosphor means coating paint is predetermined to deposit with said first phosphor means layer an amount of antimony trioxide which is equal to about 0.1 to about 0.5% by weight of the total phosphor which is to be included in said first and second phosphor means layers.

25. The method as specified in claim 24, wherein said antimony trioxide content is added to said first phosphor means coating paint is predetermined amount to deposit with said first phosphor means layer an amount of antimony trioxide which is equal to about one-quarter percent by weight of the total phosphor which is to be included in said first and second phosphor means layers.

* * * * *